United States Patent [19]

Gray

[11] Patent Number: 4,795,677

[45] Date of Patent: Jan. 3, 1989

[54] OXIDATION-INHIBITED CARBON-CARBON COMPOSITES

[75] Inventor: Paul B. Gray, Bonita, Calif.

[73] Assignee: GA Technologies Inc., San Diego, Calif.

[21] Appl. No.: 81,126

[22] Filed: Aug. 3, 1987

Related U.S. Application Data

[63] Continuation-in-part of Ser. No. 798,994, Nov. 18, 1985, which is a continuation-in-part of Ser. No. 676,985, Nov. 30, 1984, abandoned.

[51] Int. Cl.$^4$ .................... B32B 9/00; B32B 31/00
[52] U.S. Cl. .................................... 428/246; 264/29.5; 264/29.7; 423/278; 423/414; 423/447.2; 427/228; 427/402; 428/240; 428/269; 428/408
[58] Field of Search ............... 423/278, 414, 447.2; 264/29.5, 29.7; 427/228, 402; 428/240, 241, 242, 244, 246, 269, 408

[56] References Cited

U.S. PATENT DOCUMENTS

| | | | |
|---|---|---|---|
| 4,429,003 | 1/1984 | Fredriksson et al. | 428/408 |
| 4,439,382 | 3/1984 | Joo et al. | 264/29.5 |
| 4,442,165 | 4/1984 | Gebhardt et al. | 428/408 |
| 4,515,847 | 5/1985 | Taverna et al. | 428/408 |
| 4,668,579 | 5/1987 | Strangman et al. | 428/408 |

Primary Examiner—William J. Van Balen
Attorney, Agent, or Firm—Fitch, Even, Tabin & Flannery

[57] ABSTRACT

Carbon-carbon composites consisting of graphite fibers reinforcing a carbon matrix are protected from oxidation by a $B_2O_3$ glass coating which includes a refractory oxide to stabilize the viscosity of the glass. Precursors of $B_2O_3$ and the refractory oxide are dispersed into a resin, the resin is used to impregnate fibrous graphite or fibrous graphitizable material, the sheets are laid up as plies and the laid-up plies are carbonized and graphitized using heat structure. The composite structure is then coated with an additional mix of resin and precursors and the coated structure is heated to carbonize the resin and leave a seal coat on the structure. Then an outer shell of a refractory material is deposited on the structure.

14 Claims, 1 Drawing Sheet

OXIDATION-INHIBITED CARBON-CARBON COMPOSITES

This application is a continuation-in-part of Ser, No. 798,994, filed Nov. 18, 1985 pending, which is a continuation-in-part of abandoned Ser. No. 676,985, filed Nov. 30, 1984, now abandoned.

The present invention relates to carbon-carbon composites and more particularly to carbon-carbon composites formed and treated so as to resist oxidation even in high temperature oxidizing environments.

BACKGROUND OF THE INVENTION

Carbon-carbon composites are tough, strong, lightweight materials that are useful as structural material in applications where strength to weight ratio is important. Carbon-carbon composites incorporate graphite fibers in a carbon matrix so as to reinforce the matrix and may be formed, for example, by impregnating graphite cloth wtth a resinous material, layering plies of the resin-impregnated graphite cloth and then carbonizing the resin-impregnated layered plies with the application of heat and pressure.

An important limitation to the use of carbon-carbon composites is the fact that they are quite susceptible to oxidation in high-temperature, oxidizing environments. Oxygen not only attacks the surface of carbon-carbon composite but seeps into the pores that invariably are present, oxidizing the surfaces of the pores and continuously weakening the composite. If carbon-carbon composites could be rendered resistant to oxidation at high temperatures, e.g., above about 500° C., and still retain their desirable thermal and mechanical properties, their usefulness would be significantly enhanced, e.g., in systems, such as heat engines and rockets, where high strength, lightweight, oxidation-resistant components are required to operate for long time periods under high stresses generated by thermal cycling. Accordingly, it is a general object of the present invention to provide carbon-carbon composites that have improved resistance to oxidation.

SUMMARY OF THE INVENTION

Oxidation-inhibited carbon-carbon composites are formed which are protected at the internal pore surfaces, the outer structural surfaces, or both by a sealant of viscosity-stabilized boron oxide glass. A metal or metalloid refractory oxide, which is partially soluble in boron oxide, is used to stabilize the viscosity of boron oxide glass in its molten state so that the glass retains sufficient viscosity to seal the surfaces and thereby protect the surfaces from oxidation.

To form an oxidation-resistant carbon-carbon composite, a precursor of boron oxide plus a precursor of a refractory oxide are mixed with a carbonaceous resin material, and the mixture is impregnated into an assemblage of fibers of graphite or a fibrous graphite precursor to form plies. The plies are layered, and the layered plies are carbonized and at least partially graphitized. Carbonization and graphitization of the layered plies produce a three-dimensional carbon matrix that is reinforced by graphite fibers.

An outer glass-forming seal coat is formed on the composite outer surface by coating the composite with a mixture of resin, the boron oxide precursor and the refractory oxide precursor and then carbonizing the resin.

To further protect the composite structure, it is preferred to place a hard refractory shell, such as a layer of silicon carbide or silicon nitride, over the composite material. The intermediate seal coat helps to accommodate differential thermal expansion between the refractory coating and the composite, while at the same time providing a source of sealing glass to close any cracks in the refractory overcoating which may exist.

The matrix and the seal coat initially each include boron oxide and refractory oxide precursors, including elemental boron, some other elemental metal or metalloid, metal boride or metalloid boride; however, in an oxidizing atmosphere, these precursors scavenge oxygen to form the oxides, thus forming a glass. The oxides occupy a substantially larger volume than do the precursors, and as the precursors oxidize, they expand to fill the pores within the composite and also completely cover its inner structural surfaces. The boron oxide and other oxides fuse at high temperatures that is viscosity stabilized by the presence of the refractory oxide, and the glass coats the pore surfaces and wets the structural graphite fiber surfaces, acting as a barrier to oxidation of the carbon. Also the glass of the seal coat is present and available to flow into and fill cracks which develop or were originally present in the refractory shell. Its stabilized viscosity prevents it from simply oozing out these cracks, and the dissolution of the refractory oxide also deters its vaporization at the outer surface of the refractory shell.

DETAILED DESCRIPTION OF THE PREFERRED EMBODIMENTS

Figure 1:
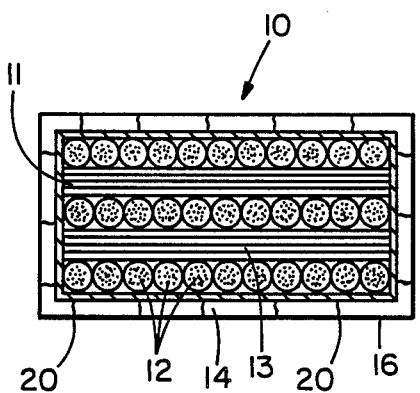
FIG. 1 is a diagrammatic representation of a carbon-carbon composite structure, embodying various features of the present invention.

In accordance with the present invention, carbon-carbon composite structures 10 (FIG. 1), in which graphite fibers 12 reinforce carbon matrices 13, are protected from oxidation at their internal pore surfaces and/or at their outer structural surfaces by boron-metal mixtures, which ultimately oxidize to form boron oxide-based glasses, which, in turn, fuse at high temperatures. The metal or metalloid which is included in the matrix, in the presence of the oxygen at high temperature, oxidizes to a refractory oxide (RO). The RO dissolves in molten boron oxide ($B_2O_3$)) glass to an extent that is preferably a function of temperature. This assures that, within a certain temperature range, the molten boron oxide glass has sufficient viscosity to protect the internal and external surfaces of the composite structure from oxidation. A seal coat 14, predominantly formed of the same $B_2O_3$ and RO precursors (the boron and metal or metalloid) surrounds the composite structure 10 and ultimately is converted to a refractory oxide-stabilized boron oxide glass that protects the external surfaces of the composite. Preferably, the composite structure is further surrounded by a shell 16 of hard refractory material, in which case, the molten glass seal coat 14 is available to fill in cracks that develop in the shell.

In order to coat the surfaces of pores that invariably develop in the composite structure when the composite is formed, precursors of the boron oxide and the refractory metal oxide are used to fill the carbonaceous resin material from which the carbon matrix of the composite is formed. Precursors are selected from boron, metal, metalloids, metal borides or metalloid borides in proportions to provide the desired ratio of $B_2O_3$ and refractory oxide.

The amounts of precursors added to the resin are such that subsequent to carbonization of the resin, the boron and the metal or metalloid, calculated as if in their fully oxidized forms, comprise between about 10 and about 1000 weight percent of the carbon matrix material of the composite, with the refractory oxide being peesent in amounts of from about 3 to about 25 mole percent of the boron oxide and preferably from about 5 to about 20 mole percent of the boron oxide. In calculating the amount of precursors to be dispersed in the resin, it may be assumed that between about 50% and about 70% of the carbon content of the resin forms the carbon matrix of the composite, and the amount of metal, metalloid, boron, metalloid boride, or metal boride added to the resin is calculated according to the carbon content of the resin to ultimately achieve a desired ratio of $B_2O_3$, RO and carbon in the matrix.

Depending upon the particular resin that is used and the particular metal or metalloid that is included with the boron to ultimately form the $B_2O_3$-RO binary system, the mixture (of resin and precursors) contains the metal or metalloid, in elemental form and/or as a moiety of the boride, at between about 15 and about 100 weight percent of the resin, and the mixture contains boron, in either elemental and/or as a moiety of the boride, at between about 5 and about 140 weight percent of the resin.

The composite which initially forms through carbonization and graphitization of the resin contains boron, predominantly in elemental and/or boride form, at between about 3 and about 300 weight percent of the carbon matrix material of tee composite and contains the metal or metalloid, predominantly in elemental and/or boride form at between about 5 and about 200 weight percent of the carbon matrix material of the composite.

The resin used to form the carbon matrix may be an inexpensive phenolic resin, a pitch-containing or pitch-based resin, or any type of thermosetting char-yielding resin, depending upon final desired properties.

The fibers may be either pre-formed graphite fibers or may be fibers of a material, such as polyacrylonitrile, rayon or pitch, that graphitizes when subjected to high temperatures. The fibers may be woven into a cloth or may be individual fibers arranged in a manner so as to best reinforce the composite for the purpose it is intended to serve. In the composite that is formed, the graphite fibers generally comprise between about 40 and about 70 weight percent of the carbon matrix material of the composite.

It is considered highly preferable that $B_2O_3$ and RO precursors be used to fill the resin, rather than $B_2O_3$ and RO, because the oxygen of these oxides would tend to oxidize carbon during resin carbonization. Such precursors may include appropriate proportions of boron, metal, metalloid, metal boride or metalloid boride in particulate form. Oxidation of the precursors to $B_2O_3$ and RO occurs when oxygen eventually eeeps into the pores of the compositss during high temperature exposure of the structure to an oxidizing atmosphere. Eventually, in a high temperature, oxidizing environment, substantially all of the precursor material which is exposed to oxidizing gases is oxidized to $B_2O_3$ and RO, which at high temperatures fuse to a glass form.

A significant advantage of providing the $B_2O_3$ and RO initially in the form of an oxidizable precursor is that the precursors initally scavenge oxygen that might otherwise oxidize the carbon matrix or graphite fibers of the composite. Importantly, the $B_2O_3$ and RO each occupy substantially more volume, typically by a factor of about 3, than do the precursor materials, and thus oxidation of the precursors within the carbon matrix swells their volume so that substantially all of the pore volume becomes occupied by an $B_2O_3$-RO binary glass system. In a typical procedure, a metal brride and powdered boron are mixed into the resin in a proportion that gives the desired molar ratio of $B_2O_3$ to RO when the metal boride and boron are fully oxidized.

In a typical composite forming procedure, plies are formed from sheets of fibrous material by impregnating the sheets with a resin, such as a phenolic resin, that has been pre-mixed with the precursors. The plies are then layered and pressed together. Subsequently, the layered plies are heated, first to carbonize the resinous material and then at higher temperatures to graphitize or stabilize the same. At this time, the composite structure may be shaped, e.g., by machining.

In someccases, the composite which is initially formed is more porous than is desired. The composite can be made less porous by impregnating the initially formed composite structure with additional resin and repeating the carbonization and graphitization steps. The impregnating resin may or may not contain $B_2O_3$ and RO precursors, depending upon the amount of the precursors used to form the original composite material.

To provide additional protection against oxidation, the outer surface of the structure is then coated with the saal coat 14. As a preferred means of forming the seal coat, $B_2O_3$ and RO precursors, such as described above, are mixed with a carbonizable resinous material, and the mixture is applied over the outer surfaces of the composite structure 10. For forming the seal coat, the $B_2O_3$ and RO precursors comprise a substantially greater proportion of the resinous mixture than was used to form the composite. Again, the metal or metalloid, in either elemental or boride form, is provided in an amount so as to ultimately provide RO from about 3 to about 25 mole percent of the $B_2O_3$ that will ultimately form and preferably between about 5 and about 20 mole percent.

Depending upon the resin that is used and the particular metal or metalloid that is included with the boron to ultimately form the $B_2O_3$-RO binary system in the seal coat, the mixture of resin and precursors contains the metal or metalloid, in either elemental form and/or as a moiety of the boride, at between about 15 and about 100 weight percent of the resin and lontains boron, in either elemental and/or as a moiety of the boride, at between about 5 and about 140 weight percent of the resin.

The seal coat 14 should contain sufficient $B_2O_3$ and RO precursors so that the $B_2O_3$-RO glass that eventually forms covers the entire surface and seals all surface pores. The seal coat initially formed over the structural surface, before oxidation of the precursors, is preferably about 50 microns thick and may be up to about 250 microns thick.

To apply the seal coat to the graphitized carbon-carbon composite structure, a slurry technique may be used. The precursors for the $B_2O_3$-RO glass are slurried in a resin that has been diluted in a relatively volatile organic solvent. The slurry is then applied to the carbon-carbon composite structure, for example, by spraying or painting, and dried on the structure using a low heat, e.g., 80° to 100° C. After the slurry is dried, the structure is heated slowly, preferably at a rate of about 0.5° C. per min. or less, to a temperature whereat the resin carbonizes. For a phenolic resin, this is about 800° C. The carbonized resin bonds the glass precursors to the structure, which is then ready for overcoating with a refractory shell.

The seal coat that initially forms on the composite contains boron, the metal or metalloid, and the carbon which results from decomposition of the resin used to form the seal coat. As the seal coat is exposed to oxygen, not only do the boron and metal or metalloid progressively oxidize to boron oxide and the refractory oxide, but the carbon content of the seal coat oxidizes or "burns" away. As the carbon burns away, the volume that was occupied by the carbon in the seal coat is replaced by the increased volume of the oxides, relative to their precursors.

In a preferred embodiment of the present invention, the carbon-carbon composite structure 10 having a seal coat 14 is overcoated with the shell 16 of refractory material. This shell serves to prevent ingress of oxygen to the carbon-carbon composite structure 10, protects the carbon-carbon composite from mechanical damage, and provides a smooth outer surface that will not be affected by high-speed fluid flow. The key requirement of the shell material is its ability to adhere well to the 10 underlying seal coat, to be chemically unreactive with the carbon-carbon composite and with the seal coat at high temperatures and to be relatively easy to apply. Suitable shells for a $B_2O_3$-RO-protected carbon-carbon composites include silicon carbide (SiC) and silicon nitride ($Si_3N_4$).

The refractory shell 16 may be applied by a number of methods as long as the deposition temperature or final heat treatment does not exceed the maximum fabrication temperature that is determined and specified for the internal sealing glass and seal coat. For example, it is possible to coat a $B_2O_3$-$ZrO_2$-protected graphite structure with a SiC shell produced from fluidized bed chemical vapor deposition (CVD) or from stationary substrate CVD. A silicon nitride shell may be produced by the method of U.S. Pat. No. 3,226,194 to Kuntz, the teachings of which are incorporated herein by reference.

The refractory shell 16 cooperates with the seal coat 14 in helping to maintain the seal coat in place on the surface of the carbon-carbon composite structure 10 and further helps to minimize vaporization of $B_2O_3$ from the seal coat. In turn, the seal coat 14 helps to maintain the barrier provided by the refractory shell 16 by flowing into microcracks 20 that invariably develop in the shell. Because the carbon-carbon composite 10 generally has a different coefficient of thermal expansion than that of the refractory shell 16, the thermal expansion mismatch tends to crack the refractory shell even when cooling subsequent to its initial deposition and almost invariably over multiple thermal cycles. The $B_2O_3$-RO glass, which is molten at elevated temperatures, flows into the cracks 20 which develop, sealing the same. This effect is promoted by initially providing the coating in the form of $B_2O_3$ and RO precursors, whereupon, as cracks develop in the shell and oxygen seeps through, the precursors oxidize to form the glass, which glass having a substantially larger volume than the precursors, forces its way into the cracks of the refractory shell.

An important aspect of the present invention, particularly for high temperature applications, is the inclusion of the RO in the presence of the $B_2O_3$. The mechanism for sealing and coating carbon-carbon composites to protect them from oxidation is to place the $B_2O_3$-RO glass on the pore surface and/or bulk structural surface. The glass melts and flows to coat surfaces and fill cracks and thus provides a barrier against oxygen ingress. Pure $B_2O_3$ glass is advantageous in this respect in that its low surface energy enhances its wetting of the surfaces of carbonaceous materials. However, at high temperatures, and especially at temperatures of about 1300° C. or above, the viscosity of pure $B_2O_3$ glass is lowered to the point where it is too fluid to remain on the surface it is to protect. Furthermore, pure $B_2O_3$ has a relatively high vapor pressure at 1300° C. and if pure $B_2O_3$ is used at very high temperatures, a substantial portion of the $B_2O_3$ soon vaporizes from the composite.

It was discovered that adding a relatively small amount of a refractory oxide precursor to the $B_2O_3$ precursor produces a $B_2O_3$ glass-refractory oxide system that is useful for protecting the carbon-carbon surfaces at high temperatures whereat pure $B_2O_3$ glass lacks sufficient viscosity. That is, at such high temperatures whereat pure $B_2O_3$ glass becomes so fluid, i.e., below about 100 poise, that it will not remain on the carbon surface, the RO dissolved in the binary glass system maintains a relatively high viscosity of the molten glass. The addition of the refractory phase to the $B_2O_3$ glass suppresses the change of viscosity with temperature; i.e., it renders the mixture's viscosity relatively invariant at high temperatures. In particular, it was discovered that the following binary RO-$B_2O_3$ systems are especially useful for the sealing of the pore surfaces of a carbon-carbon composite: $TiO_2$-$B_2O_3$, $ZrO_2$-$B_2O_3$, $HfO_2$-$B_2O_3$, $Al_2O_3$-$B_2O_3$, $Y_2O_3$-$B_2O_3$, $Sc_2O_3$-$B_2O_3$, $La_2O_3$-$B_2O_3$ (La representing any member of the lanthanide series), $SiO_2$-$B_2O_3$, and $CeO_2$-$B_2O_3$. Further, it was found that RO at between about 3 and about 25 mole percent of the $B_2O_3$ in the glass provides the viscosity leveling property of the RO-$B_2O_3$ mixture, i.e., provides a iiscosity-leveled glass (VLG) that will wet and protect the carbon-carbon composite pore surface and structural surfaces over temperature ranges from 550° to 1370° C.

The viscosity leveling effect was discovered when a refractory phase was partially dissolved in the $B_2O_3$ glass and then observed to dissolve further as the temperature of the mixture was raised. It was found that the solution of the refractory phase in the boron oxide rich molten glass sealer leveled the viscosity and kept it within a range that permits flow of the mixture over the surface of the carbon-carbon composite pores throughout the 550°–1370° C. range.

Figure 2:
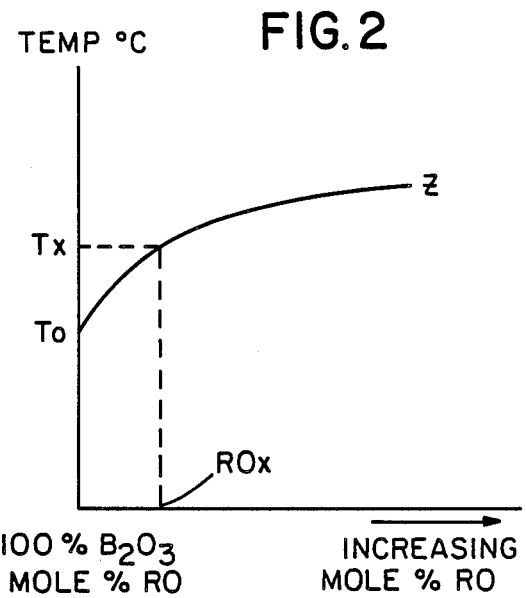
FIG. 2 is an idealized graphic representation of the relationship between solubility of a refractory oxide in molten boron oxide with temperature in several boron oxide-refractory oxide binary system.

The viscosity leveling effect is due in large part to the increased solubility of th refractory oxide in molten boride oxide glass with increasing temperatures. FIG. 2 represents a relationship between solubility of a refractory oxide in molten boron oxide glass and temperature which holds generally true for many refractory oxides. In the graph of FIG. 2, the abscissa represents the relative mole proportions of boron oxide and refractory oxide with 100% boron oxide represented at the origin and increasing proportions of refractory oxide in the mole percent to the right. Temperature is shown on the ordinate. At $T_0$, which represents the melting point of boron oxide (about 450° C.), substantially all of the liquid phase is boron oxide; however, as the temperature increases, progressively increasing amounts of the refractory oxide dissolve into the molten boron oxide glass. In the idealized situation represented in the graph, curved line $T_0Z$ is a plot of temperature versus refractory oxide solubility, and the amount of refractory oxide dissolved in the glass at any temperature $T_X$ can be determined by drawing a horizontal line from $T_X$ to line $T_0Z$ and dropping a vertical line from the intersection to the abscissa. In general, an increase in the proportion of refractory oxide in the molten glass tends to increase the viscosity of the molten glass, whereas an increase in temperature decreases the viscosity of the molten glass. Under certain circumstances, it has been found that the increase in dissolved refractory metal oxide caused by increasing temperature results in a substantial slowing of the decrease in viscosity of the molten glass, which is referred to as a viscosity leveling effect.

The relationships between temperature, solubility of the refractory oxide and viscosity are, in actuality, somewhat more complicated due to a variety of factors. For example, whereas there is a general correspondence between increasing percentagss of dissolved refractory oxide and increasing viscosity, a very small amount of dissolved refractoy oxide may in some cases actually decrease the viscosity. At the elevated temperatures whereat boron oxide is molten, the chemical species present are not limited to the refractory oxide and boron oxide but include mixed metal or metalloid borates. Furthermore, in rapidly fluctuating temperature conditions, equilibrium conditions are seldom seen, and the boron oxide melt is more often either supersaturated or unsaturated.

Furthermore, the flow characteristics of the molten boride glass with the dissolved refractory oxide is not a function of the viscosity of the molten phase alone. In providing the viscosity leveled glass protection in accordance with the present invention, the refractory oxide is always provided in amounts sufficient so that throughout the intended use temperature range of the composite, some refractory oxide remains undissolved. Accordingly, the binary system always includes both a liquid phase, i.e., glass, and the undissolved crystals reduce the flowability of the liquid phase.

Accordingly, the viscosity characteristics must be determined empirically for each refractory oxide-boron oxide binary system of a particular refractory oxide at a particular mole percent. Generally, the refractory oxide selected and the optimal mole percent must be determined for a particular use temperature range of the carbon-carbon composite structure. The refractory oxide must adequately stabilize the viscosity within the use temperature range, assuring that the viscosity does not drop below about 100 poise, as measured by the torsional vibrational technique, or else the melt will tend to flow off of the carbon surfaces and fail to protect the carbon from oxidation.

The percentage of refractory oxide must be above a lower threshold limit because, as noted above, small percentages of refractory oxide may actually reduce hhe viscosity and because it is desirable to provide enough refractory oxide so that some refractory oxide will remain in solid phase throughout the use temperature range.

On the other hand, excessive quantities of refractory oxide are to be avoided because too large quantities of undissolved refractory oxide will excessively reduce the wettability and flowability of the glass, which may cause structure-weakening strain on the composite during thermal cycling. It is preferred that throughout the temperature range from where the boron oxide first begins to liquify through the uppermost temperature to which the composite structure is to be subjected, the viscosity of the glass does not exceed about $10^7$ poise.

Another consideration in determining suitability of a binary system is chemical stability of the system. The ultimate use temperature for composite which is protected by a refractory oxide-stabilized boron oxide glass is about 1500° C. due to preferential carbothermic reduction of the boron oxide within the matrix. Certain binary systems, however, become chemically unstable at lower temperatures, for example, a $TiO_2$-$B_2O_3$ system.

A further consideration in determining stability of binary system is the ability of the refractory oxide stabilized glass to wet the carbon surfaces. If the wetting angle becomes too high, the molten phase will tend to bead up on the surfaces of the composite and fail to adequately protect the same from oxidation. To assure adequate protection by the binary glass system, the wetting angle of the molten glass should be low (about 90° or less) throughout the use temperature range. The use temperature of $Al_2O_3$-$B_2O_3$, for example, is limited to that at which about 6% $Al_2O_3$ is fully dissolved in $B_2O_3$ because at higher $Al_2O_3$ percentages the melt fails to adequately wet the carbon surfaces.

Although insufficient wetting of the carbon surfaces may be a problem with certain binary systems, both silicon carbide and silicon nitride are readily wet by any of the contemplated binary systems of the present invention. Thus, the molten $B_2O_3$-baed glasses adhere well to the interior surface of the shell 16 and also flow readily into any microcracks in the shell.

With the above-described considerations in mind, it can be appreciated that the temperature range of viscosity leveling of a binary system is dependent upon the choice of refractory oxide, by the mole percent of the refractory oxide, and by the ultimate intended use temperature of the composite structure. $ZrO_2$-$B_2O_3$ and $HfO_2$-$B_2O_3$ systems exhibit good high temperature (1200°–1400° C.) sealing, stability and viscosity behavior while for low to moderate temperatures, i.e., 900°–1200° C., $TiO_2$-$B_2O_3$ glasses exhibit useful properties. The $Al_2O_3$-$B_2O_3$ system works well for a low-temperature regime (550°–900° C.), but its ability to wet carbon-carbon composites diminishes with increasing percentages of $Al_2O_3$. The (Sc, Y, La)$_2O_3$-$B_2O_3$ systems also work to inhibit the oxidation of carbon-carbon composites. However, the optimal temperature ranges of these binary systems are not as fully worked out.

The choice of final heat treatment temperature for composite densification (graphitization) is governed by the interaction between the fibers, carbon matrix, and the inhibitor particulates. The optimum heat treatment temperature is one which maximizes the interaction between the inhibitor particulate phase and the carbon matrix while minimizing the interaction between the inhibitor and the carbon fiber. To determine the optimum heat treatment temperature, the carbon-carbon composite containnng the precursor particles is first heated to about 800° C. in an inert atmosphere to convert the phenolic matrix to carbon and drive off most of the volatiles. Further heating is done in a dilatometer to determine the temperature whereat the reaction of the sealer and the matrix occurs. Determination of the sealer-matrix interaction temperature is required for each binary system, and this temperature limits the final heat treatment of the sealed carbon-carbon composite during manufactuee. For example, the maximum heat treatment for the sealer system $B_2O_3$-$ZrO_2$ is determned to be 1700° C. Avoiding interaction between the sealer materials and the host carbon-carbon composite matrix and fibers prevents degradation of the fibers and ensures that the highest strength of the composite will be retained.

An important advattage of providing the RO in addition to the $B_2O_3$ is that $B_2O_3$ has a relatively high vapor pressure at elevated temperatures, particularly in the presence of water vapor, and it was further discovered that the ROs, such as those listed above, reduce the high temperature vapor pressure of $B_2O_3$ glass. This further consideration in selecting a suitable binary system for a use temperature range, as the refractory oxide should sufficiently lower the vapor pressure of $B_2O_3$ to prevent excess vaporization thereof during the life of the composite component.

RO's generally tend to reduce the chemical activity of $B_2O_3$ both with water vapor and with carbon, thereby increasing the chemical and thermodynamic stability of the glass when in contact with the host carbon fibers and carbon matrix as well as with other materials that may be optionally added to the host carbon-carbon composite.

The invention will now be described in greater detail by way of specific examples which are intended to exemplify but not to limit the scope of the present invention.

EXAMPLE 1

43.3 w/o $ZrB_2$ was mixed with 56.7 w/o boron powder. This ratio of particulates transforms upon oxidation to a composition with a 86:14 molar ratio $B_2O_3$-$ZrO_2$ mix. This molar ratio is presently considered optimal for providing viscosity leveling in a $B_2O_3$-$ZrO_2$ binary system. Three parts by weight of SC-1008 phenolic resin obtained from Monsanto, Chemicals, St. Louis were mixed with two parts by weight of the boron and $ZrB_2$ particulates in a high shear mixer to achieve homogeneity. This mix was then painted onto conventional carbon fiber cloth (T-300 PAN fibers) an the excess mix was removed with a flexible rubber roller, forming plies. The impregnated plies were then heated to 80° C. for 15–20 minutes to partially cure the resin and render the plies convenient to handle. The individual plies were laid up to form a composite and loaded into a press with heated platens. The composite receieed the following heat/press schedule:

| Temperature Range (°C.) | Pressure Range (kg/cm$^2$) | Time (hr) |
| --- | --- | --- |
| 22–80 | 17.5 | 1 |
| 80–90 | 17.5–53 | 1 |
| 90–180 | 53 | 1 |

-continued

| Temperature Range (°C.) | Pressure Range (kg/cm$^2$) | Time (hr) |
| --- | --- | --- |
| 180–200 | 53 | 1 |

The composites were then packed in sand and carbonized in an inert atmosphere in a retort furnace. The composites were slowly heated to 500° C., rapidly to 800° C. and then cooled.

Next, stabilization or high-temperature processing was performed in an inert atmosphere at 1700° C. for one hour. After cooling, the composites were given three impregnation, carbonization, graphitization cycles using the phenolic resin alone as an impregnant.

Using this processing, an inhibitor loading level of approximately 15 weight percent is realized for the inhibitor system calculated as the $ZrO_2$ and $B_2O_3$. This composite also contained from 10 to 20 volume percent porosity. At this inhibitor loading level, upon oxidation, there is ample $B_2O_3$-RO sealer to fill in all of the accessible matrix and interfiber porosity.

At this time the composite is machined into a block $2'' \times \frac{1}{4}'' \times \frac{1}{4}''$.

100 gm of the phenolic resin used above was dissolved in 150 ml of ethyl alcohol and a slurry is formed adding 43 gm. of $ZrB_2$ and 56 gm. of powdered boron. Approximately 0.250 gm. of slurry was painted onto the structure produced above, which had a surface area of about $2\frac{1}{8}$ in$^2$. The structure was then dried for one hour at 100° C. Next, the structure was placed in an inert atmosphere and heated at a rate of about 0.5° C. per min. to 800° C., and maintained at 800° C. for 30 min., and cooled slowly.

The structure was overcoaeed by chemical vapor deposition with a 200 micron thick layer of silicon carbide.

The coated carbon-carbon composite structure was tested for various mechanical properties, and the results are given in Table 1 below:

TABLE 1

| Property | Value | Test Method |
| --- | --- | --- |
| Flexural Strength | 1900 kg/cm$^2$ | 4 PT 7:1 span to depth beam |
| Young's modulus | 8 × 10$^5$ kg/cm$^2$ | 4 PT 25:1 span to depth beam |
| Fracture strain | 0.29% | 4 PT 25:1 span to depth beam |
| Calc shear stress maximum unoxidized | 56.0 kg/cm$^2$ | 4 PT 7:1 span to depth beam |
| Calc shear stress, maximum 50-hr, oxidized, coated | 105 kg/cm$^2$ | 4 PT 7:1 span to depth beam |

These results show that the carbon-carbon composites coated for oxidation inhibition retain the desirable mechanical characteristics of raw carbon-carbon composites.

The carbon-carbon composite was tested for oxidation resistance by temperature cycling in the presence of air continuously for 1000 hours repeating 500 times a two hour cycle in which the composite was maintained at 650° C. for $\frac{1}{2}$ hour, raised to 1350° C. during a second $\frac{1}{2}$ hr., maintained a 1350° C. for a third $\frac{1}{2}$ hr., and lowered to 650° C. during the final $\frac{1}{2}$ hr. During about the first 20 hours, the weight of the composite increased continuoully up to about 2$\frac{1}{2}$ percent above the starting weight, this weight gain presumably representing the oxidation of $ZrB_2$ and B to form the binary $ZrO_2$-$B_2O_3$ system. After this initial weight rise, no further weight change was seen over the 1000 hr. cycling time, indicating that no further oxidation of the precursors occurred. Also, no weight loss was seen, indicating that the carbon was not oxidizing. The mechanical properties of the carbon-carbon composite after the 1000 hr. cycle were substantially unchanged.

EXAMPLE 2

To demonstrate the viscosity leveling effect of a refractory oxide on $B_2O_3$ glass, an 88 mole % $B_2O_3$, 12 mole % $ZrO_2$ mixture was prepared. The mixture was heated to 1400° C., whereat the $B_2O_3$ fused to a molten glass and the $ZrO_2$ was fully dissolved therein, and then the glass was cooled to solidify the same.

Figure 3:
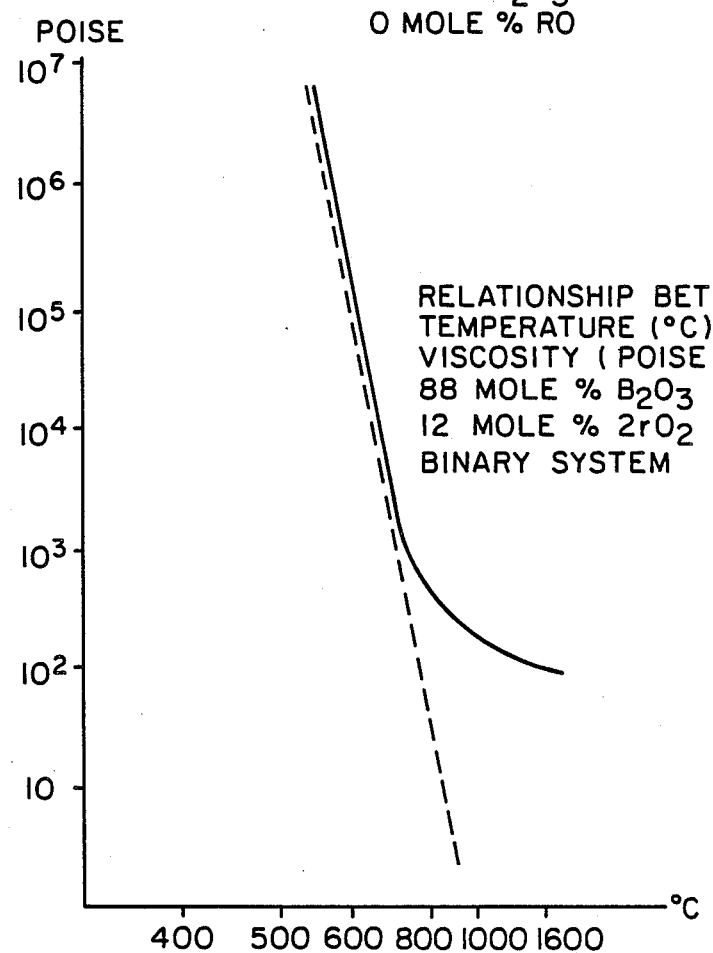
FIG. 3 is a semi-log graph showing a viscosity leveling effect of $ZrO_2$ on $B_2O_3$ glass, with viscosity in poise being shown on the logarithmic abscissa and temperature in ° C. being on the ordinate, with the temperature scale being linear with respect to reciprocal temperature.

The glass was again heated slowly until melting began at just over 500° C., and the viscosity in poise was measured by the torsional vibration technique which uses a vibrating sphere viscometer. The glass continued to be heated with viscosity measurements taken at various temperatures. The semi-log graph of FIG. 3 illustrates the results of these measurements. The solid line represents the measure of the viscosities at the various temperatures. The broken line represents the relationship of viscosity and temperature of a pure single phase glass that follows Arrenius law, which is expressed in the formula:

$$n = n_o \exp^{-(E_{ACT}/RT)}$$

where;
n is the actual viscosity;
$n_o$ is the preexponential viscosity;
$E_{ACT}$ is activation energy (KJ/mole);
R is the gas constant; and
T is temperature.

The broken line determined by the Arrenius law equation is straight in this plot which relates reciprocal temperature to log viscosity. It can be seen from the graph that at about 800° C. and upwards, whereas a pure glass would tend to continue to decrease in viscosity, the viscosity of the binary system levels off at about 100 poise.

It is inherent from the above-discussion that becuuse the carbon-carbon composites are formed with $B_2O_3$ and RO precursors, including metal particulates, metal boride particulates and boron particulates, and that these precursors oxidize upon exposure to oxygen, the composition of the composites change over time and in the presence of an oxidizing atmosphere from containing predominantly the unoxidized precursors until substantially all of the precursor is oxidized. It is to be understood that where the composites of the invention are described as including $B_2O_3$ and ROs, that it is intended that the invention is inclusive of these same composites before the precursors have fully oxidized.

This application discusses the boron oxide and refractory oxide precursors as ultimately oxidizing to boron oxide and refractory oxide. However, during the usable life of any structural component constructed in accordance with this invention, it is unlikely that all of the precursors will, in fact, be oxidized; nevertheless, the precursors are available to scavenge oxygen should oxidizing gases reach them. Typically, a component constructed as described above will initially contain predominantly the precurors, both internally and in its seal coat. The outer shell of silicon carbide or silicon nitride is applied in an inert atmosphere to avoid oxidation; however, due to differential coefficients of thermal expansion of the shell and composite, microcracks develop in the shell, even during the initial cooling of the shell, and almost certainly during repeated thermal cycling. In a high temperature oxidizing environment, oxygen, either as $O_2$ and/or as a moiety of another oxidizing gas, enters through the microcracks. The precursors in the seal coat then oxidize to produce the viscosity leveled glass. The glass, having a higher volume forces its way into the microcracks sealing the same. As long as the protection provided by the glass in the seal coat and by the refractory shell is maintained, oxidizing gases may never reach the internal structure of the composite. However, should the shell and seal coat fail for any reason, e.g., because of chipping during use of the component, the precursors dispersed internally within the matrix will scavenge oxygen, producing a wetting, viscosity leveled glass in the pores to protect the internal surfaces against oxidation, thereby extending the life of the component part.

It may now be seen that the invention provides improved carbon-carbon composites. The carbon-carbon composites have mechanical strengths that compare favorably to carbon-carbon composites formed in a similar manner but not formed and treated to be oxidation-resistant. By incorporating the $B_2O_3$-RO glass into the carbon matrix of the carbon-carbon composite structure, coating the structure with an additional RO seal coat and overlaying a refractory shell around the structure, oxidizing attack on the carbon of the structure is substantially eliminated. An additional, unexpected advantage of the carbon-carbon composites of the present invention is that reaction of the metallic boron with the resin matrix during fabrication of the carbon-carbon composite tends to increase the interlaminar shear strength of the composite structure.

Wiile the invention has been described in terms of certain preferred embodiments, modifications obvious to one with ordinary skill in the art may be made without departing from the scope of the present invention. For example, while the invention has been described primarily in terms of binary $B_2O_3$-RO glass sealant systems, a mixture of more than one RO with the $B_2O_3$ may prove to be useful in certain carbon-carbon composite applicttions; however, the viscosity leveling relationships of such systems would be significantly more complicated.

Although it is highly preferred in most applications to provide both $B_2O_3$-RO glass precursors in the graphite matrix for the purpose of coating internal pore surfaces as well as a sealer coat of $B_2O_3$-RO glass precursors for the purpose of protecting the structural surface and pores that open thereto, it is to be understood that the internal inclusions and the glass seal coat each contribute individually to oxidation protection. Thus, in addition to a carbon-carbon composite having both forms of protection, the invention is intended to encompass carbon-carbon composites having either form of protection, individually.

The invention has been described herein primarily in terms of refractory oxides having increasing solubility in $B_2O_3$ glass with increasing temperature, whereby the RO stabilizes viscosity through a temperature range. However, refractory oxides which have sufficient solubility through a temperature range, for example, refractory oxides that are completlly miscible with molten $B_2O_3$ glass, may be used to maintain the viscosity above about $10^2$ poise throughout a temperature range to which the composite component will be subjected. Preferably the refractory oxide between the melting temperature ($T_0$) of $B_2O_3$ and the highest temperature at which the component will be used does not at any point increase the viscosity of the $B_2O_3$ glass above about $10^7$ poise. Again, the wetting angle of the binary glass system, from the melting temperature of $B_2O_3$ to the highest use temperature of the composite component, should remain under 90°.

Various features of the invention are set forth in the following claims.

I claim:

1. An oxygen-resistant structure comprising a carbonous structural matrix formed with interstices throughout, a metal or metalloid, in elemental form and/or as an oxidizable moiety, said metal or metalloid being dispersed throughout said matrix and comprising between about 5 and about 200 weight percent of said matrix, and boron, in elemental form and/or as an oxidizable moiety, said boron being dispersed throughout said matrix and comprising between about 3 and about 300 weight percent of said matrix, said boron and said metal or metalloid oxidizing when exposed to a high-temperature, oxidizing environment to form boron oxide and a metal oxide or a metalloid oxide within the interstices and at the surface of said matrix; at high temperatures the metal oxide or metalloid oxide which forms stabilizing the viscosity of the molten phase of the boron oxide which forms.

2. An oxygen-resistant, high-temperature composite comprising a structure which includes a carbonous matrix formed with interstices throughout and reinforcing, high-temperature fibers disposed within said matrix, a metal or metalloid, in elemental form and/or as an oxidizable moiety, dispersed throughout said structure, said metal or metalloid comprising between about 5 and about 200 weight percent of said matrix, and boron, in elemental form and/or as an oxidizable moiety, dispersed throughout said strccture, said boron comprising between about 3 and about 300 weight percent of said matrix; said boron and said metal or metalloid oxidizing when exposed to a high-temperature, oxidizing environment to form boron oxide and a metal oxide or a metalloid oxide within the interstices and at the surface of said matrix; at high temperatures the metal oxide or metalloid oxide which forms stabilizing the viscosity of the molten phase of the boron oxide which forms.

3. An oxygen-resistant composite according to claim 2 in combination with an outer refractory coating.

4. A combination in accordance with claim 3 wherein said outer refractory coating is formed of material selected from the group consisting of silicon carbide and silicon nitride.

5. An oxygen-resistant composite according to claim 2 having a seal coat covering the structural surfaces of said composite, said seal coat comprising additional boron and additional metal or metalloid, said boron and metal or metalloid of said seal coat oxidizing in a high temperature, oxidizing environment to further protect said composite from oxidation.

6. A composite according to claim 5 in combination with an outer refractory coating that covers said composite structure and said seal coat.

7. A composite in accordance with claim 2 wherein said reinforcing fibers are carbon fibers.

8. A composite in accordance with claim 2 wherein said metal or metalloid is selected from the group consisting of Ti, Zr, Hf, Al, Y, Sc, La, Si and Ce.

9. A method of preparing an oxygen-resistant carbonous structure comprising providing a carbon char-yielding material, in said char-yielding material, dispersing boron, in either elemental form and/or as an oxidizable moiety, at between about 5 and about 140 weight percent of said char-yielding material and also dispersing a metal or metalloid, in elemental form and/or as an oxidizable moiety, at between about 15 and about 100 weight percent of said char-yielding material, and heating said char-yielding material to carbonize the same and thereby form a carbonous matrix, said boron and said metal or metalloid oxidizing when exposed to a high-temperature, oxidizing environment to form boron oxide and a metal oxide or a metalloid oxide within the interstices and at the surface of said matrix; at high temperatures the metal oxide or metalloid oxide which forms stabilizing the viscosity of the molten phase of the boron oxide which forms.

10. A method of preparing an oxygen-resistant composite cmmprising providing a carbon char-yielding material, in said char-yielding material dispersing boron, in either elemental form and/or as an oxidizable moiety, at between about 5 and about 140 weight percent of said char-yielding material and also dispersing a metal or metalloid, in elemental form and/or as an oxidizable moiety, at between about 15 and about 100 weight percent of said char-yielding material, impregnating reinforcing, high-temperature fibers with said dispersion, forming a three-dimension structure with said dispersion-impregnated fibers, and heating said three-dimensional structure to carbonize said char-yielding material and thereby form a carbonous structure in which a carbonous matrix is reinforced by said fibers; said boron and said metal or metalloid oxidizing when exposed to a high-temperature, oxidizing environment to form boron oxide and a metal oxide or a metalloid oxide within the interstices and at the surface of said carbonous structure; at high temperatures the metal oxide or metalloid oxide which forms stabilizing the viscosity of the molten phase of the boron oxide which forms.

11. A method according to claim 10 further comprising dispersing boron an a metal or metalloid, each in either elemental and/or as an oxidizable moiety, in a carbon char-yielding material, applying said dispersion to the surface of said carbonous structure, and heating said structure to carbonize the char-yielding material in said surface-applied dispersion, thereby forming a seal coat over the outer surfaces of said carbonous structure.

12. A method according to claim 11 wherein the metal or metalloid is provided in an amount sufficient to ultimately provide its oxide at from about 3 to about 25 mole percent of the $B_2O_3$ that is ultimately formed in said seal coat.

13. A method according to claim 11 further comprising overcoating said seal coat with a outer coating of refractory material.

14. A method of protecting a high-temperature structure from oxidation comprising dispersing, in a carbon char-yielding material, boron and a metal or metalloid, each in either elemental form and/or as an oxidizable moiety, the metal or metalloid, calculated as the metal oxide or metalloid oxide being provided, at from about 3 to about 25 mole percent of boron, calculated as $B_2O_3$; applying said dispersion to surfaces of said structure; and carbonizing said char-yielding material thereon to form a seal coat; said boron and metal or metalloid in said seal coat ultimately oxidizing in a high-temperature, oxidizing environment to form boron oxide and metal oxide or metalloid oxide; at high temperatures, the metal oxide or metalloid oxide that forms stabilizing the viscosity of the molten phase the $B_2O_3$ that forms.

* * * * *

UNITED STATES PATENT AND TRADEMARK OFFICE
CERTIFICATE OF CORRECTION

PATENT NO. : 4,795,677

DATED : January 3, 1989

INVENTOR(S) : Paul B. Gray

It is certified that error appears in the above-identified patent and that said Letters Patent is hereby corrected as shown below:

| | |
|---|---|
| Column 1, Line 5: | Change "Ser," to --Ser.--. |
| Column 1, Line 21: | Change "wtth" to --with--. |
| Column 2, Line 58: | Change "($B_2O_3$))" to --($B_2O_3$)--. |
| Column 3, Line 20: | Change "pesent" to --present--. |
| Column 3, Line 45: | Change "tee" to --the--. |
| Column 4, Line 3: | Change "eeeps" to --seeps--. |
| Column 4, Line 4: | Change "compositss" to --composites--. |
| Column 4, Line 20: | Change "brride" to --boride--. |
| Column 4, Line 33: | Change "someccases" to --some cases--. |
| Column 4, Line 43: | Change "saal" to --seal--. |
| Column 5, Line 5: | Change "beu-" to --be--. |
| Column 5, Line 21: | Change "expoeed" to --exposed--. |
| Column 5, Line 37: | Delete "10". |
| Column 6, Line 27: | Change "oomposite" to --composite--. |
| Column 6, Line 34: | Change "beoomes" to --becomes--. |

UNITED STATES PATENT AND TRADEMARK OFFICE
CERTIFICATE OF CORRECTION

PATENT NO. : 4,795,677

DATED : January 3, 1989

INVENTOR(S) : Paul B. Gray

It is certified that error appears in the above-identified patent and that said Letters Patent is hereby corrected as shown below:

| | |
|---|---|
| Column 6, Line 51: | Change "iiscosity" to --viscosity--. |
| Column 6, Line 65: | Change "th" to --the--. |
| Column 7, Line 32: | Change "percentagss" to --percentages--. |
| Column 8, Line 2: | Change "hhe" to --the--. |
| Column 8, Line 42: | Change "baed" to --based--. |
| Column 9, Line 3: | Change "containnng" to --containing--. |
| Column 9, Line 12: | Change "manufactuee" to --manufacture--. |
| Column 9, Line 13: | Change "determned" to --determined--. |
| Column 9, Line 19: | Change "advattage" to --advantage--. |
| Column 9, Line 55: | Change "an" to --and--. |
| Column 9, Line 61-62: | Change "receieed" to --received--. |
| Column 10, Line 35: | Change "overcoaeed" to --overcoated--. |
| Column 10, Line 67: | Change "continuoully" to --continuously--. |
| Column 11, Line 44: | Change "beuuse" to --because--. |

UNITED STATES PATENT AND TRADEMARK OFFICE
CERTIFICATE OF CORRECTION

PATENT NO.   :   4,795,677

DATED        :   January 3, 1989

INVENTOR(S)  :   Paul B. Gray

It is certified that error appears in the above-identified patent and that said Letters Patent is hereby corrected as shown below:

Column 12, Line 38:   Change "Wiile" to --While--.

Column 12, Line 46:   Change "applicttions" to --applications--.

Column 12, Line 67:   Change "complettly" to --completely--.

Column 13, Line 38:   Change "strccture" to --structure--.

Column 14, Line 17:   Change "cmmprising" to --comprising--.

Column 14, Line 39:   Change "an" to --and--.

Signed and Sealed this

Fourth Day of February, 1992

Attest:

HARRY F. MANBECK, JR.

*Attesting Officer*　　　　*Commissioner of Patents and Trademarks*